April 27, 1954   A. H. KING   2,676,682
REDUCTION GEAR SHIFTING MECHANISM
Filed May 21, 1949   3 Sheets-Sheet 1
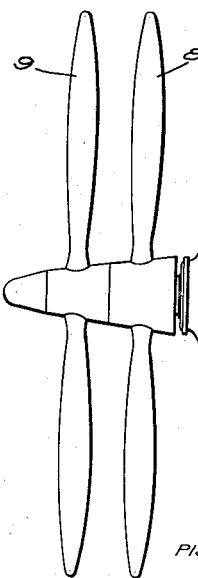
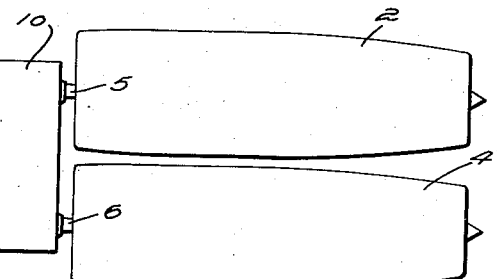
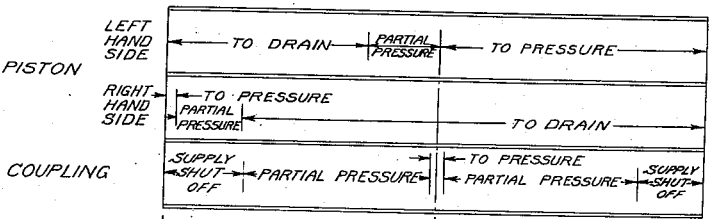
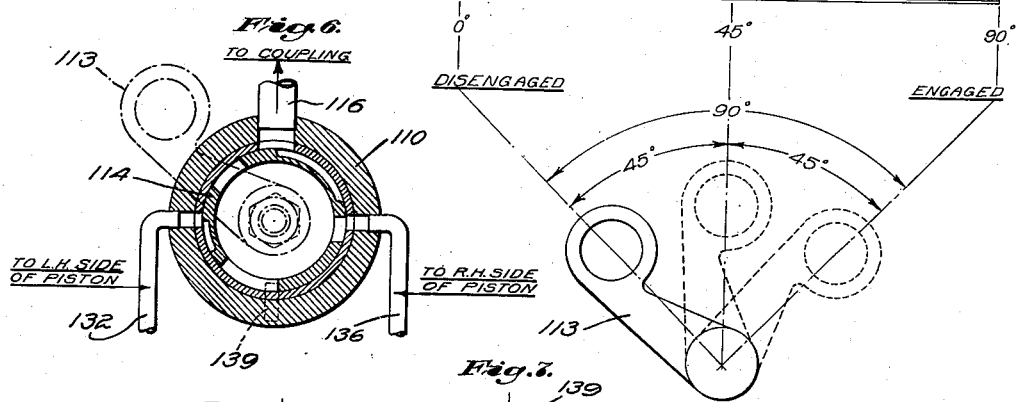
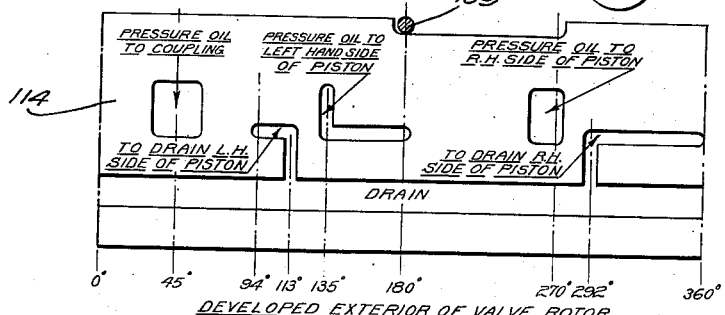
Inventor
Alexander H. King
By Charles A. Warren
Attorney

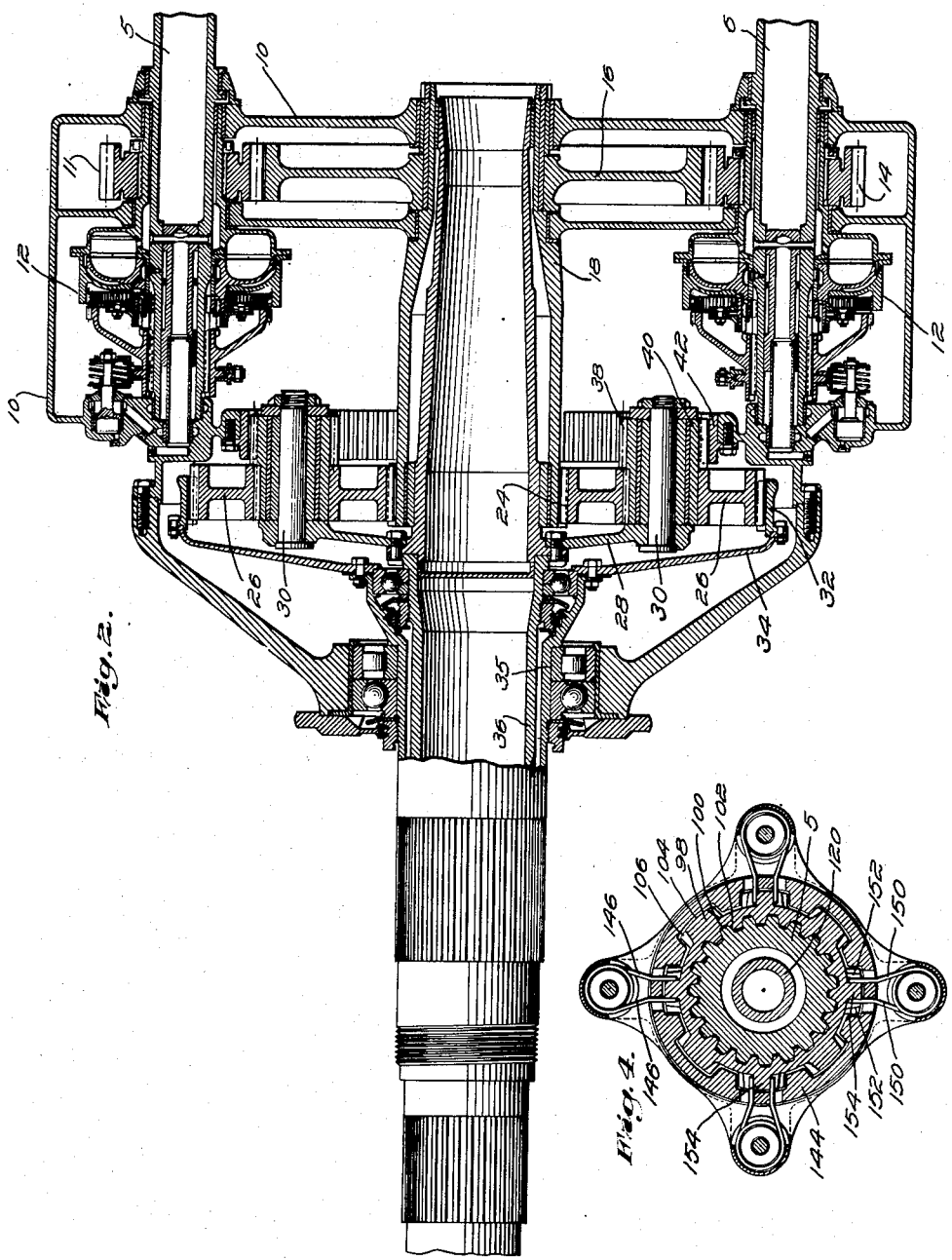

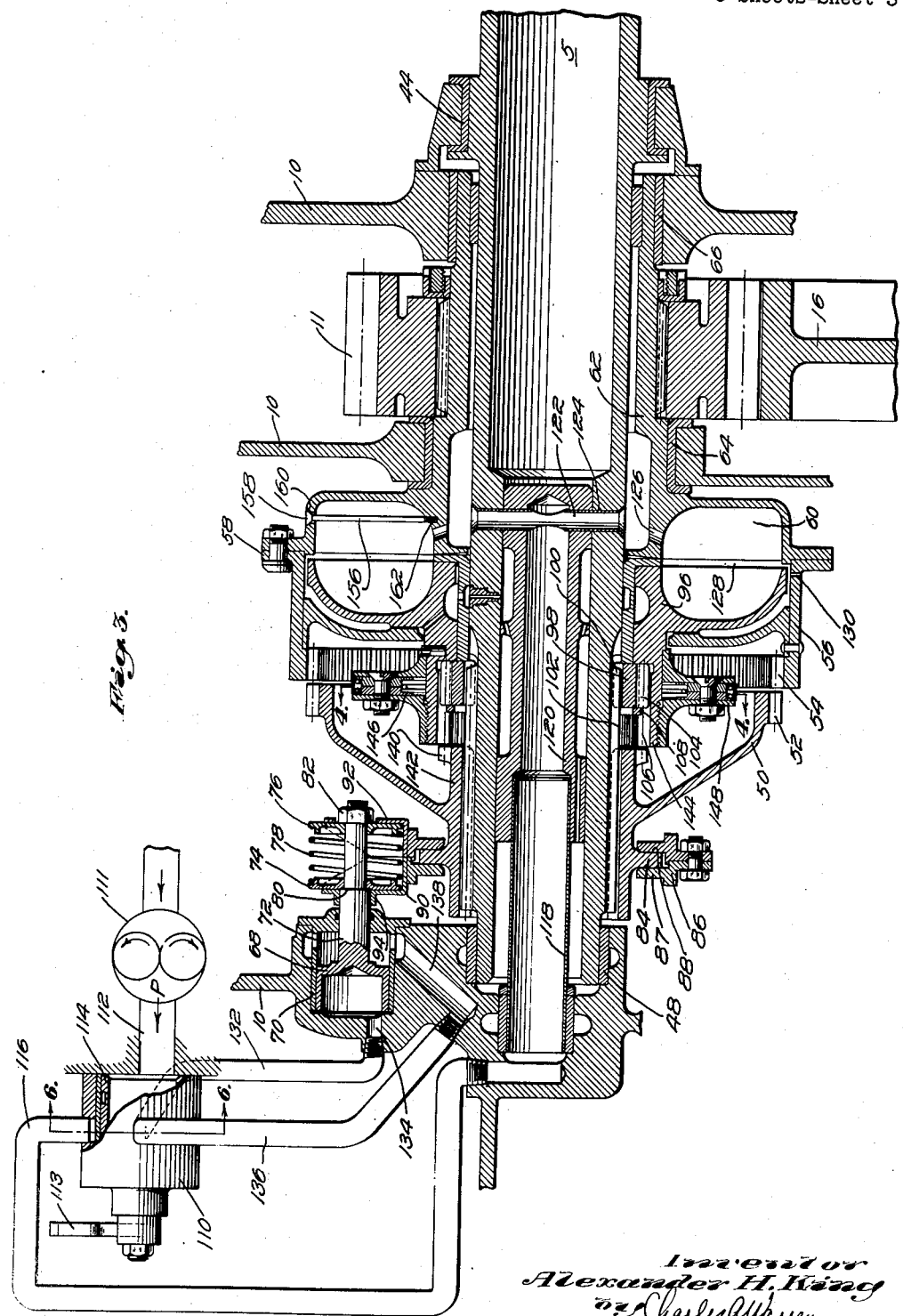

Patented Apr. 27, 1954

2,676,682

UNITED STATES PATENT OFFICE 2,676,682

REDUCTION GEAR SHIFTING MECHANISM

Alexander H. King, West Hartford, Conn., assignor to United Aircraft Corporation, East Hartford, Conn., a corporation of Delaware Application May 21, 1949, Serial No. 94,695

6 Claims. (Cl. 192—3.2)

1

This invention relates to a coupling construction particularly adapted for use in connecting one or more of a series of prime movers to a single power shaft or for disconnecting one or more of the prime movers from the power shaft. While the invention is equally adaptable to many types of prime movers, it is illustrated here in connection with an aircraft power plant in which one or more independently operated power plants is used to drive dual rotating power shafts having propellers thereon.

In using a series of power plants in this manner, the non-operating power plants are disengaged from the power shaft, and in starting the first of the series it is desirable to have this first power plant also disengaged from the power shaft. The coupling which connects each of the power plants to the power shaft preferably is comprised of a fluid coupling by which to bring the driven shaft up-to-speed and also a mechanical coupling which may be engaged during normal running to eliminate any slip in the drive and to provide a direct connection between each power plant and the power shaft. A feature of the invention is a mechanical clutch with an automatic lock-out which permits engagement of the mechanical coupling only when the power plant and the power shaft are rotating at equal speeds with no torque being transferred between them, in conjunction with a fluid coupling by which to bring the driven element up to the speed of the driving element. Another feature is a thermostatically controlled valve in the fluid coupling for preventing overheating of the fluid therein and resultant damage to the coupling.

The power plant arrangement may be such that one of the power plants may be used for starting the other power plant, or power plants, in addition to accelerating the power shaft to operating speed. With such an arrangement the driving shaft of the power plant being cranked becomes the driven shaft. A feature of the invention is a clutch which is equally effective when operating in a normal manner to drive a power plant or when used in starting another power plant from an operating power plant.

Other features and advantages will be apparent from the specification and claims and from the accompanying drawings which illustrate an embodiment of the invention.

In the drawings:

Fig. 1 is a view showing the general arrangement of an aircraft power plant having two independent power plants driving dual rotating propellers through couplings as taught by this invention.

2

Fig. 2 is a sectional view through the coupling housing showing the arrangement by which either power plant may be used for powering the driven shaft.

Fig. 3 is a sectional view on a much larger scale of one of the couplings.

Fig. 4 is a sectional view of the lock-out mechanism on the line 4—4 of Fig. 3.

Fig. 5 shows the sequence of operation of the valve for controlling fluid to the coupling and to the sliding gear.

Fig. 6 is a sectional view of the control valve on line 6—6 of Fig. 3.

Fig. 7 is a developed exterior of the control valve rotor.

The invention is illustrated in connection with an aircraft power plant and Fig. 1 shows independently operated power plants 2 and 4 having shafts 5 and 6, respectively, for driving propellers 8 and 9 through couplings 12 (Fig. 2) in coupling housing 10. Either one or both of the power plants may be used for driving the propellers. While only two power plants are shown here, it is obvious that by arranging the couplings in the coupling housing and their associated power plant, any number of power plants may be circumferentially mounted for driving the propeller shafts.

As shown in Fig. 2, the shaft 5 for power plant 2 drives gear 11 through one of the couplings 12 and the shaft 6 for power plant 4 drives a similar gear 14 through a second coupling 12. The gears 11 and 14 are in mesh with a large diameter gear 16 which is splined on shaft 18. The shaft is journalled in the coupling housing 10 which also supports the shafts 5 and 6 and the associated couplings 12.

The shaft 18 has an integral sun gear 24 meshing with a series of pinions or planet gears 26 carried by a cage 28, the gears being journalled on pins 30 supported by the cage. The planet gears also mesh with a ring gear 32 connected as by a plate 34 to the outer shaft 35 of the propeller drive. The cage 28 is connected to the inner shaft 36 and is caused to rotate in a direction opposite to the shaft 35 by reason of the arrangement of the gears. Propellers 8 and 9 of Fig. 1 are mounted on shafts 35 and 36 respectively.

To assure rotation of the shafts 35 and 36 in opposite directions and at the same rate of speed, the planet gears 26 are splined to sleeves 38 which carry gear teeth 40 in mesh with a fixed gear 42 located within the housing 10. Thus, the rate of rotation of the planet gears about the axis of the sun gear is limited thereby to control the relative rates of rotation of the two propeller driving shafts. This particular dual rotation reduction gear is described and claimed in King Patent No. 2,603,107, issued July 15, 1952, and assigned to applicant's assignee, and will not be described in detail since it is not an essential part of the present invention.

The couplings 12 are so arranged that when either driving shaft 5 or 6 is rotated by its associated power plant, the driven gear 11 or 14 may be brought up-to-speed before the positive mechanical drive connection between the driving shaft and the gear is engaged.

With reference now to Fig. 3 which shows the details of the coupling, shaft 5 is journalled in the bearing elements 44 and 46 which are supported within housing 10. The shaft has splined thereon for axial movement a sliding gear 50, the teeth 52 on the periphery of which are adapted to mesh with teeth 54 on the housing 56 of the fluid coupling 58. The housing 56 is directly connected to the runner 60 of the fluid coupling, the latter having a projecting sleeve 62 journalled in the bearings 64 and 66 within housing 10. As shown, the gear 11 is splined to the sleeve 62.

The sliding gear 50 and the intermeshing teeth 54 on the housing 56 thus provide a direct mechanical connection between the shaft 5 and driven pinion 11. This gear 50 is moved into or out of engagement with the teeth 54 hydraulically as by means of a plurality of actuating pistons 68, only one being shown, which is located in cylinder 70 within the housing 10. The projecting piston rod 72 has mounted thereon spaced sliding collars 74 and 76 between which is positioned a coil spring 78 urging the collars apart; the collar 74 is held against shoulder 80 on the piston rod and collar 76 against a nut 82 on the end of the rod.

The gear 50 has a radially projecting flange 84 thereon engageable by an actuating ring 86 having inwardly projecting flanges 87 and 88 located on opposite sides of the flange 84. The collars 74 and 76 are received between spaced flanges 90 and 92 on the actuating ring 86, the flange 90 preferably having a bore 94 through which the piston rod 72 extends.

With the arrangement described, the admission of fluid under pressure, described hereinafter, to the left-hand end of cylinder 70 moves the piston to the right thereby compressing the spring 78 to apply pressure through collar 76 to the flange 92 and thereby to urge the gear 50 toward the right. The lock-out mechanism, also described hereinafter, will permit the gear teeth 52 to move into mesh with the teeth 54 only when no torque is being transmitted from the shaft 5 to the sleeve 62. Similarly, admission of fluid under pressure to the right-hand end of the cylinder 70 moves the piston to the left compressing the spring 78 and applying a force to the left against the flange 90, thereby moving the gear 50 to the left and out of mesh with the teeth 54 when little or no torque is being transferred from the shaft 5 to the sleeve 62.

The driven gear 11 is brought up to substantially the speed of the driving shaft 5 by means of the fluid coupling 58. To this end the impeller 96 of the coupling is splined indirectly to the driving shaft 5 through a splined ring 98 which, as shown in Fig. 4, has a series of splines 100 on its inner surface engaging with similar splines 102 on the driving shaft 5, the latter splines being in the arrangement shown the same splines on which the gear 50 is slidable. The ring 98 on its outer surface has a loose spline connection with the impeller 96 since the projecting teeth 104 thereon are narrower than the grooves 106 in which the teeth are received. The ring may be held in proper axial relation to the impeller and to the shaft 5 by a clamping ring 108 as shown in Fig. 3.

Fluid for operating the coupling 58 and the sliding gear 50 is controlled by the valve 110 shown in Fig. 3. Fluid is supplied to this valve as by pump 111 through conduit 112. The operation of this valve is illustrated in Fig. 5. As the control arm 113, and the rotor 114 to which it is attached, is slowly rotated in a clockwise direction from the full-line position shown, fluid is admitted to the coupling through conduit 116, through tube 118 and sleeve 120 both located within the hollow shaft 5, through transverse tube 122 located in radial bore 124 of the shaft 5, and thence through passage 126, several of which are located in the runner 60, to the chamber 128 in which the impeller and runner vanes are located. A bleed 130 for the chamber 128 is provided in the housing 56.

As shown in Fig. 5, fluid is admitted to the coupling when the arm 113 has been moved through a small angle clockwise to cause operation of the coupling before the gear 50 is moved axially into driving engagement. As the arm 113 is advanced further clockwise, the left-hand side of the piston 68 actuating the sliding gear 50 is connected to fluid pressure through conduit 132 and passage 134 tending to move the piston and the gear to the right for engaging the gear. When the arm has been advanced 45° (arm 113 vertical) the coupling and the piston are subject to full fluid pressure. The arm is held in this position until engagement occurs, described hereinafter, and then the arm quickly is advanced to its extreme clockwise position. At this point the fluid supply to the coupling is shut off and the sliding gear is held in its engaged position by full fluid pressure on the left-hand side of the actuating piston 68. Fluid within the coupling chamber 128 is drained through bleeds 130.

To disengage gear 50, the control arm 113 is rapidly moved counterclockwise to its limiting position. During this cycle, fluid pressure on the left-hand side of the actuating piston is vented to drain and the right-hand side of the piston is subjected to fluid pressure through conduits 136 and 138 tending to move the piston and the gear to the left, disengaging the gear. It should be noted from Fig. 5 that when the control arm is in its extreme counterclockwise position the fluid supply to the coupling is shut off and the left-hand side of the actuating piston is vented to drain. Also the right-hand side of the piston is subject to full fluid pressure thus tending to disengage the sliding gear 50, if it is engaged, and to keep it disengaged. While only one valve 110 is shown in the drawings, it is to be understood that a separate valve is required for each coupling and power plant combination used in conjunction with the single power shaft.

Fig. 6 shows a sectional view of the control valve 110 on line 6—6 of Fig. 3. The rotor 114 is shown in position and the location of the conduits for conducting fluid to the coupling 58 and to the opposite sides of the actuating piston 68 are shown.

Fig. 7 shows a developed exterior of the valve rotor 114. Fluid is admitted to the center of the rotor and then passed to the coupling 58 and the actuating piston 68 through the ports in the rotor when the ports are aligned with their corresponding passage in the valve body. Stop 139 limits the movement of the rotor 114.

As fluid is admitted to coupling chamber 128, the runner of the coupling begins to rotate and ultimately brings the speed of the driven gear 11 substantially to the speed of the driving shaft 5, except for the slip existing within the coupling. When the driven gear has reached its maximum speed, the power plant speed is reduced enough to bring its speed lower than that of the driven gear 11. This is possible due to the difference in decelerating characteristics between the power plant and the driven members. When the power plant is decelerated, its speed will drop off faster than will the speed of the driven gear and its associated power shaft. Thus there will be a point at which the speeds of the two are equal, at which point it is possible to establish the mechanical connection between the power plant and the driven gear.

When the driven gear and the shaft 5 reach exactly the same speed the sliding gear 50 is moved into mesh with the gear teeth 54. The mechanism which makes this possible includes teeth 140, on the hub 142 of the gear 50, which have the same contour and dimensions as the grooves 106 with which they are adapted to engage by axial movement of the gear. When the shaft 5 is driving the coupling impeller, that is, applying torque thereto, the loose splines on the driving ring 98 permit limited angular movement of grooves 106 out of alignment with the teeth 140 so that as the gear 50 is urged to the right, the teeth 140 contact the end of the sleeve 144, which is integral with the impeller 96 and in which the grooves 106 are located, thereby preventing the gear 50 from moving far enough to the right to cause the gear teeth 52 and 54 to mesh.

When no torque is applied to the splined ring 98, however, the latter is moved into its central position, as shown in Fig. 4, by springs 146 carried by a supporting structure 148 mounted on the sleeve 144. The springs have inwardly extending fingers 150 engaging notches 152 provided in the side surfaces of teeth 104 and lugs 154 on sleeve 144 thereby tending to position the teeth 104 centrally of the associated grooves 106 in such a way that the teeth 140 can slide into the grooves, to permit engagement of teeth 52 and 54. Thus, whenever fluid is supplied to the coupling, the gear teeth 52 and 54 are out of alignment except at a time when no torque is being transmitted through the splined ring 98. This must of necessity be a time when the driving and driven elements are rotating at the same speed in order that the gear teeth 52 and 54 can be moved into mesh at a time when there will be no load thereon.

In addition to driving the propeller shafts from the driving shaft 5, it may be advantageous to drive the propeller shafts from both driving shafts 5 and 6. It will be apparent that the coupling associated with the shaft 6 operates in a similar way and will provide for engagement of the gear teeth 52 and 54 in that coupling only when there is no torque being transmitted from the shaft 6 to the gear 14.

In a power plant arrangement of this character, it may be advantageous to start one of the power plants from the other power plant. That is to say, the power plant driving shaft 5 may be operating at normal speed and it may be desired to operate the power plant connected to shaft 6.

The coupling 12 is so constructed that the driven gear 11 or 14 also may function as the driving gear and the shaft 5 or 6, normally the driving shaft, may thus become the driven shaft. In this event, referring to Fig. 3, the runner 60 becomes the impeller, the impeller 96 becomes the runner, the splined ring 98 transmits the torque between the shaft 5 and the gear 11 and the loose splined construction described before will cause the misalignment of the teeth 140 and the grooves 106. Thus, with one power plant operating, the other power plant may be started and brought up-to-speed by means of the fluid coupling associated with it, and after this power plant has been set in operation, it can be accelerated until its speed is equal to the speed of its driving member, at which point the mechanical coupling can be engaged.

A thermostatic control for the fluid coupling 58 is illustrated at 156 in Fig. 3. This control is designed to empty the coupling chamber 128 if the temperature of the fluid therein should exceed a safe value. It consists of a valve 158 cooperating with seat 160 in runner housing 60. The lower end of the stem is threaded and screws into threads 162 in the inner hub of the runner housing. The valve is constructed of a material having a relatively high coefficient of expansion and the number of valves required in each runner housing is determined by the rapidity with which it is desired to empty the coupling chamber.

Although the device has been described in conjunction with driving shafts 5 and 6, it will be understood that any number of power plants may be used if desired; the couplings 12 providing for the selective starting of any of the power plants after the first power plant has been set in operation and mechanically coupled to the power shaft. In addition, when the entire power plant arrangement has been shut down, any one of the power plants may be started independently of the propeller by means of its associated coupling, the latter permitting subsequent mechanical coupling of the power plant to the propeller drive.

The operation of connecting one or more of a series of power plants to a single power shaft is performed in the following manner. One power plant, for example power plant 2, which previously has been disconnected from the power shaft, is started. When this power plant has reached the desired operating conditions, the valve control arm 113 is slowly advanced clockwise. This will admit fluid pressure to the fluid coupling which, in turn, will set the driven gear and its associated power shaft in operation. After fluid has been admitted to the coupling and torque is being transferred between the power plant and the power shaft, further rotation of the control arm will admit fluid to the piston actuating the sliding gear which will tend to engage the mechanical clutch. However, the lock-out mechanism will prevent engagement until the fluid coupling is not transmitting torque.

When the valve control arm has been rotated through one-half of its maximum travel angle, it is held in this position until the mechanical clutch has been engaged. Engagement is brought about by quickly decelerating the power plant. When the speed of the power plant is equal to the speed of the power shaft, the lock-out mechanism will permit the sliding gear 50 to engage with the runner gear 54. This will render a direct mechanical connection between the power plant and the power shaft. The valve control arm is then rotated to its maximum clockwise position which will shut off the fluid supply to the coupling while subjecting the actuating piston to full fluid pressure to maintain it in its extreme right-hand position.

In a power plant arrangement of the type described herein, only one power plant need be equipped with a starter. A second power plant, for example power plant 4, can be connected to the power shaft in the following manner. Since the power shaft is being driven by the power plant 2, the gear 14 and the fluid coupling runner connected with it will be rotating and the runner will act as an impeller when fluid is admitted to the coupling. The control arm 113 of the valve associated with the coupling connected to the power plant 4 is slowly advanced clockwise. This will admit fluid pressure to the fluid coupling which, in turn, will set the power plant in motion. The power plant can then be set in operation, after which the valve control arm is rotated to its maximum clockwise position. This will shut off the fluid supply to the coupling while subjecting the piston for actuating the sliding gear to full fluid pressure to maintain it in its extreme right-hand position. The power plant is then slowly accelerated and the lock-out mechanism will permit engagement of the mechanical coupling when the speed of the power plant is equal to the speed of the power shaft.

Disengaging one power plant from the power shaft is accomplished by quickly moving the valve control arm 113 to its maximum counter-clockwise position. This will vent the left-hand side of the actuating piston to drain and at the same time it will admit fluid pressure to the right-hand side of the actuating piston, tending to move the sliding gear 50 to the left and out of engagement with the runner gear 54. However, this gear will not move to the left until the torque load is less than the friction drag on the splines of the mechanical clutch. This is done by quickly decelerating the power plant and when the no torque condition exists the sliding gear will be caused to move to the left and out of engagement by the fluid pressure on the right-hand side of the actuating piston.

It is to be understood that the invention is not limited to the specific embodiment herein illustrated and described, but may be used in other ways without departure from its spirit as defined by the following claims.

I claim:

1. In a power transmission, a driving member and a driven member, a fluid coupling interconnecting said members and having an impeller and a runner, said impeller being connected with said driving member and said runner being connected with said driven member, a toothed ring connected to said runner, a gear mounted on said driving member and axially slidable thereon, said gear having a peripheral row of teeth for engaging said toothed ring to drivingly connect said members in parallel relation to said coupling and a splined hub substantially less in diameter than said peripheral row of teeth, a splined sleeve associated with said impeller and adapted to mesh with said splined hub, means for angular displacement of said sleeve with respect to the driving member when the coupling transmits torque, and means for aligning the splines on said hub and sleeve to permit meshing thereof and engagement of said toothed ring and gear when the impeller and runner speeds are equal.

2. In a power transmission, a driving member and a driven member, a fluid coupling interconnecting said members and having an impeller and a runner, said impeller being connected with said driving member and said runner being connected with said driven member, a splined sleeve connected to said impeller, means for angular displacement of said sleeve and impeller with respect to the driving member when the coupling is transmitting torque, a toothed ring connected to said runner, a gear mounted on said driving member and axially slidable thereon, said gear having a splined hub adapted to mesh with said splined sleeve and a toothed rim substantially larger in diameter than said splined hub for engaging said toothed ring to drivingly connect said members in parallel relation to said coupling, means for sliding said gear into and out of engagement, and means for aligning the splines on said hub and sleeve to permit meshing thereof and engagement of said toothed ring and toothed rim when the coupling is transmitting no torque.

3. In a power transmission, a driving member and a driven member, a fluid coupling interconnecting said members and having an impeller and a runner, said impeller being connected with said driving member and said runner being connected with said driven member, a splined sleeve associated with said impeller, means for angular displacement of said sleeve and impeller with respect to the driving member when the coupling is transmitting torque, a toothed ring connected to said runner, a gear mounted on said driving member and axially slidable thereon, said gear having a splined hub adapted to mesh with said splined sleeve and a toothed rim substantially larger in diameter than said splined hub for engaging said toothed ring to drivingly connect said members in parallel relation to said coupling, fluid means for engaging and disengaging said gear with said toothed ring, means for regulating fluid flow to said coupling and said engaging means, and means for aligning the splines on said hub and sleeve to permit meshing thereof and engagement of said toothed ring and toothed rim when the coupling is transmitting no torque.

4. In a power transmission, a driving member and a driven member, a fluid coupling interconnecting said members and having an impeller and a runner, said impeller being connected with said driving member and said runner being connected with said driven member, a splined sleeve associated with said impeller, means for effecting angular displacement of said sleeve and impeller with respect to the driving member when the coupling is transmitting torque, a toothed ring connected to said runner, a gear mounted on said driving member and axially slidable thereon, said gear having a splined hub adapted to mesh with said splined sleeve and a toothed rim substantially larger in diameter than said splined hub for engaging said toothed ring to drivingly connect said members in parallel relation to said coupling, fluid means for engaging and disengaging said gear with said toothed ring, means for coordinating fluid flow to said coupling and said engaging means to first fill said coupling and then actuate said engaging means, and means for aligning the splines on said hub and sleeve to permit meshing thereof and engagement of said toothed ring and toothed rim when the coupling is transmitting no torque.

5. In a power transmission, a driving member and a driven member, a fluid coupling interconnecting said members and having an impeller and a runner, said impeller being connected with said driving member and said runner being connected with said driven member, a splined sleeve connected to said impeller, means for effecting limited angular displacement of said sleeve and impeller with respect to the driving member when the coupling is transmitting torque, a toothed ring connected to said runner, a gear mounted on said driving member and axially slidable thereon, said gear having a splined hub adapted to mesh with said splined sleeve and a toothed rim substantially larger in diameter than said splined hub for engaging said toothed ring to drivingly connect said members in parallel relation to said coupling, fluid means for engaging and disengaging said gear with said toothed ring, means for regulating fluid flow to said coupling and said engaging means, thermostatically controlled means for rapidly draining overheated fluid from said coupling, and means for aligning the splines on said hub and sleeve to permit meshing thereof and engagement of said toothed ring and toothed rim when the coupling is transmitting no torque.

6. In a power transmission, a driving member and a driven member, a fluid coupling interconnecting said members and having an impeller and a runner, said impeller being connected with said driving member and said runner being connected with said driven member, a splined sleeve associated with said impeller, means for effecting angular displacement of said sleeve and impeller with respect to the driving member when the coupling is transmitting torque, a toothed ring connected to said runner, a gear mounted on said driving member and axially slidable thereon, said gear having a splined hub adapted to mesh with said splined sleeve and a toothed rim substantially larger in diameter than said splined hub for engaging said toothed ring to drivingly connect said members in parallel relation to said coupling, fluid means for engaging and disengaging said gear with said toothed ring, means for coordinating fluid flow to said coupling and said engaging means to first fill said coupling and then actuate said engaging means, and means for aligning the splines on said hub and sleeve to permit meshing thereof and engagement of said toothed ring and toothed rim when the coupling is transmitting no torque and the rotational speeds of said ring and said rim are equal.

References Cited in the file of this patent

UNITED STATES PATENTS

| Number | Name | Date |
|---|---|---|
| 1,953,458 | Bauer et al. | Apr. 3, 1934 |
| 2,366,646 | Orr | Jan. 2, 1945 |
| 2,410,556 | Ware | Nov. 5, 1946 |
| 2,417,198 | Hindmarch | Mar. 11, 1947 |
| 2,417,566 | Polomski | Mar. 18, 1947 |
| 2,418,833 | Huebner | Apr. 15, 1947 |
| 2,421,501 | Hasbrouck | June 3, 1947 |
| 2,466,721 | Maurer et al. | Apr. 12, 1949 |
| 2,468,107 | Powell | Apr. 26, 1949 |
| 2,505,857 | Gregory | May 2, 1950 |

FOREIGN PATENTS

| Number | Country | Date |
|---|---|---|
| 135,929 | Austria | Dec. 27, 1933 |
| 680,578 | Germany | Sept. 1, 1939 |